May 29, 1934.　　　　F. T. ALLEN　　　　1,960,404
LAUNDRY MACHINERY
Filed Oct. 21, 1931　　　7 Sheets-Sheet 1
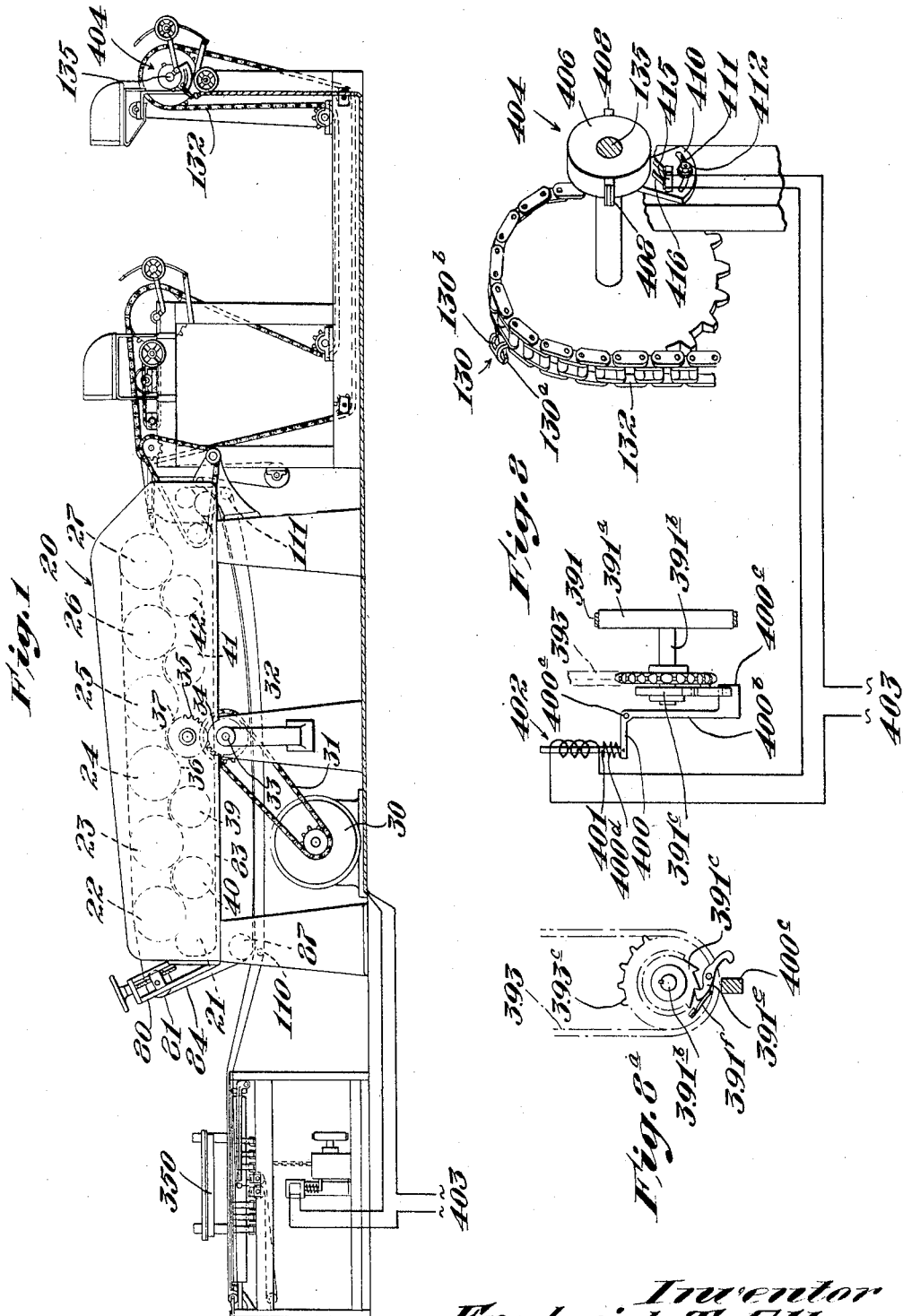

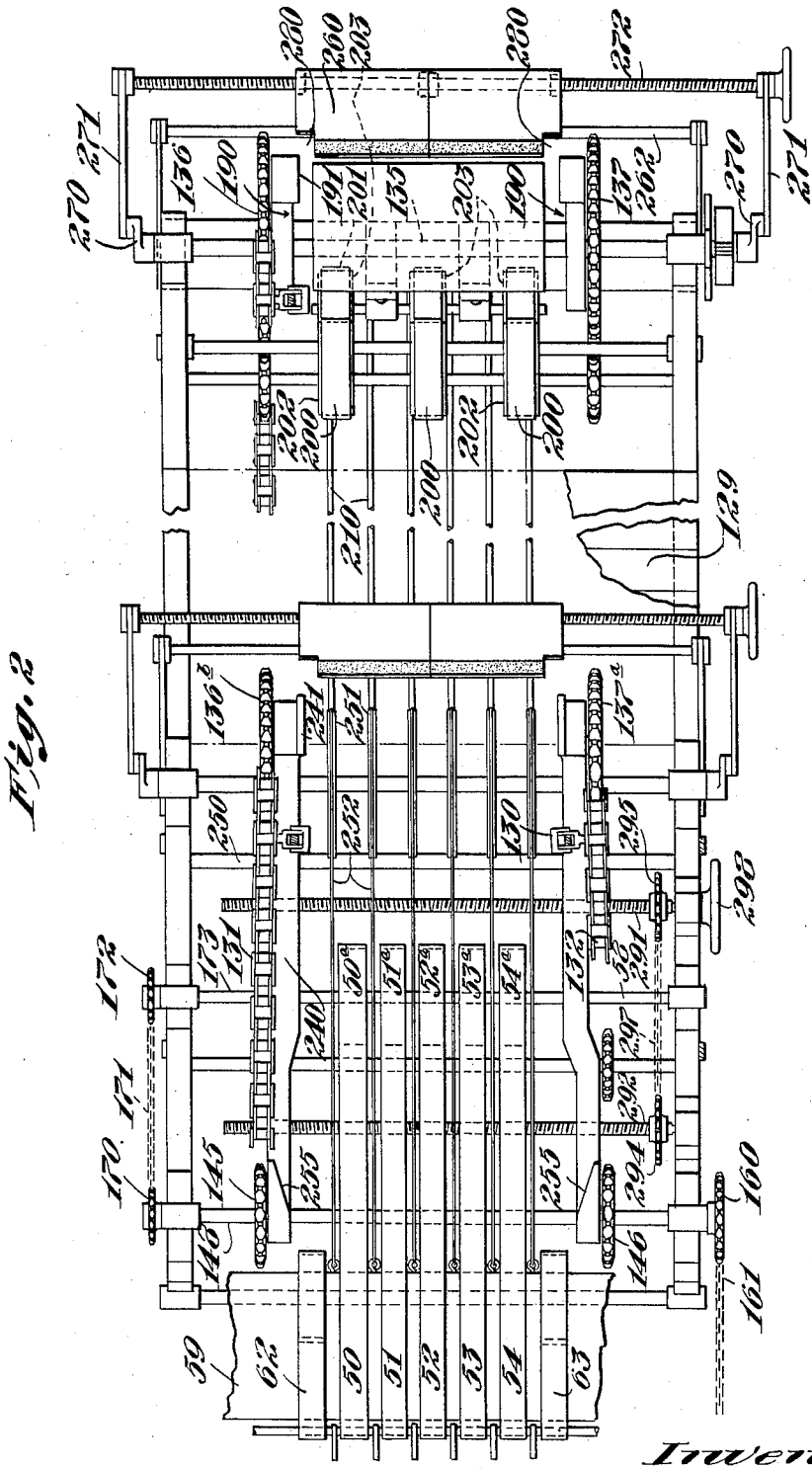

May 29, 1934.  F. T. ALLEN  1,960,404
LAUNDRY MACHINERY
Filed Oct. 21, 1931  7 Sheets-Sheet 3
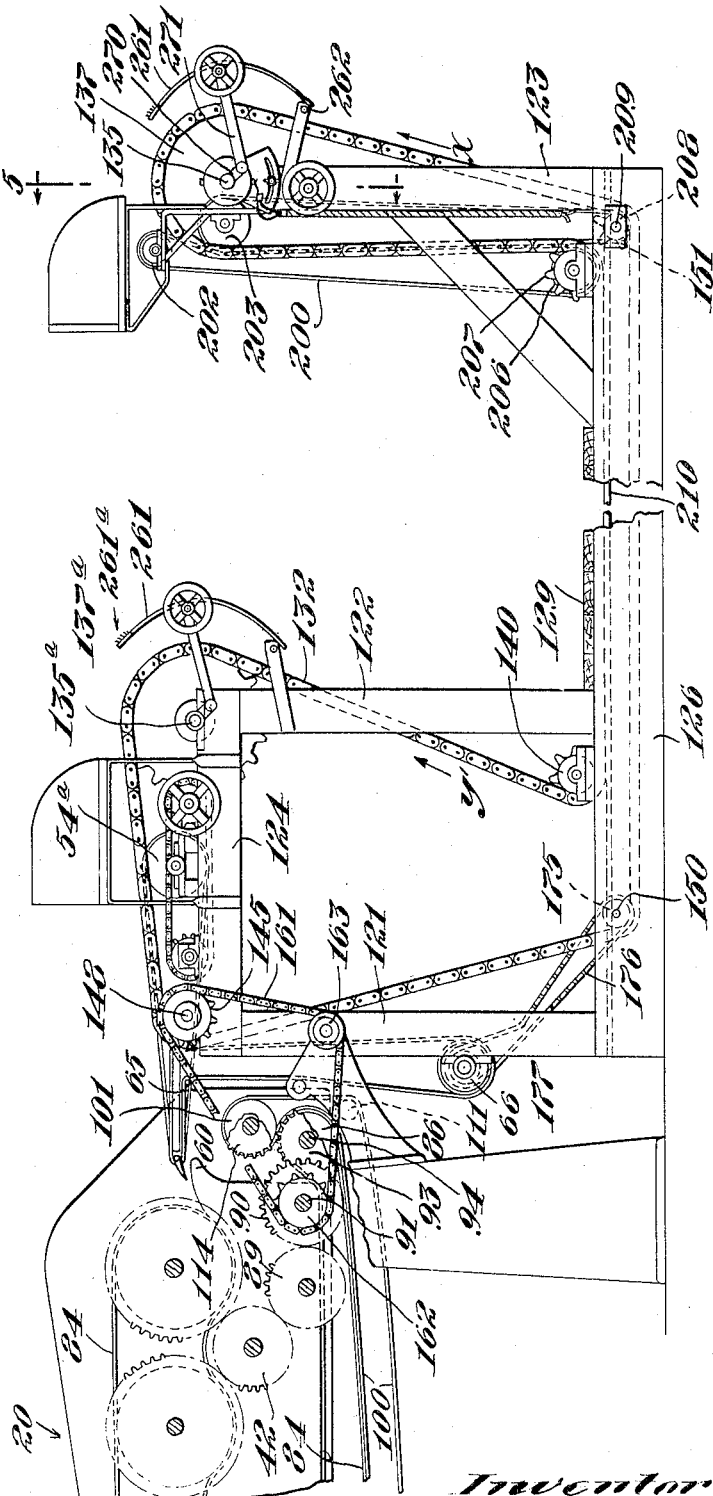
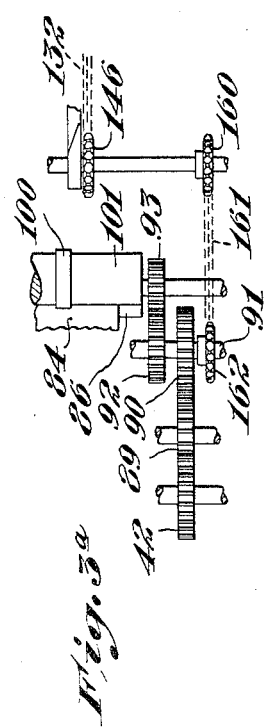

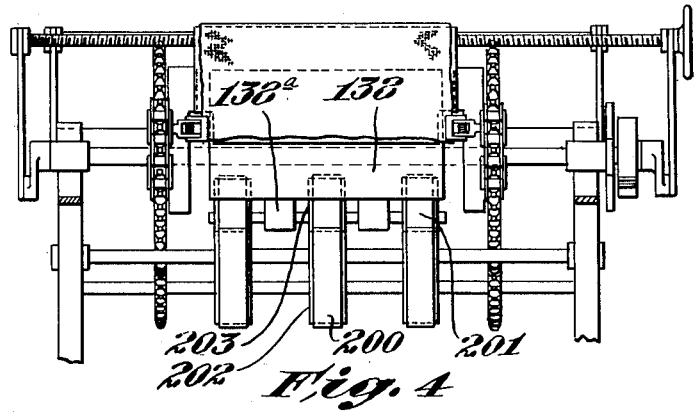
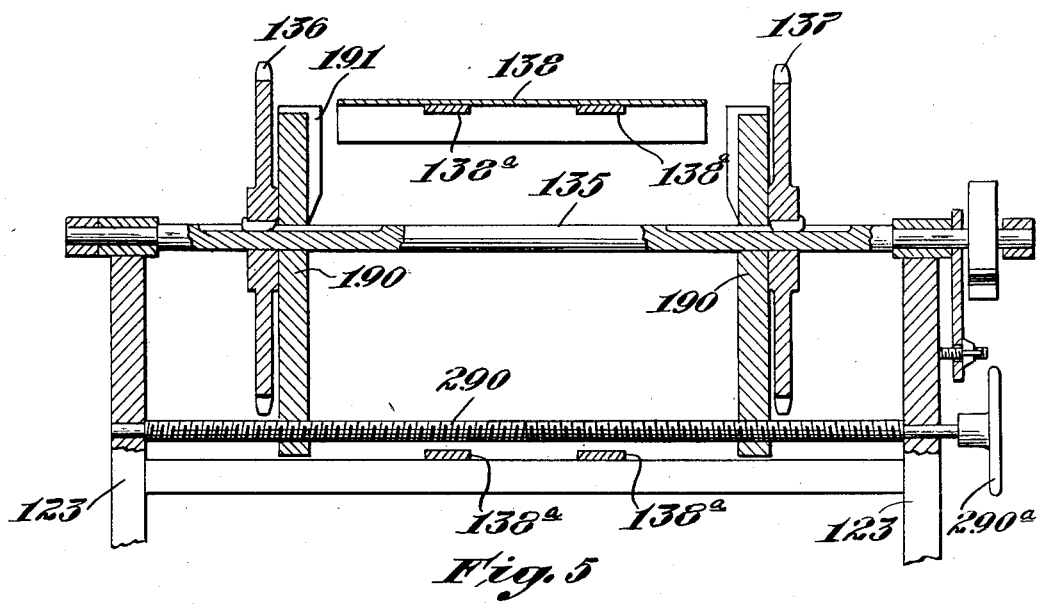

May 29, 1934.  F. T. ALLEN  1,960,404
LAUNDRY MACHINERY
Filed Oct. 21, 1931  7 Sheets-Sheet 5

Inventor
Frederick T. Allen

May 29, 1934. F. T. ALLEN 1,960,404
LAUNDRY MACHINERY
Filed Oct. 21, 1931 7 Sheets-Sheet 6
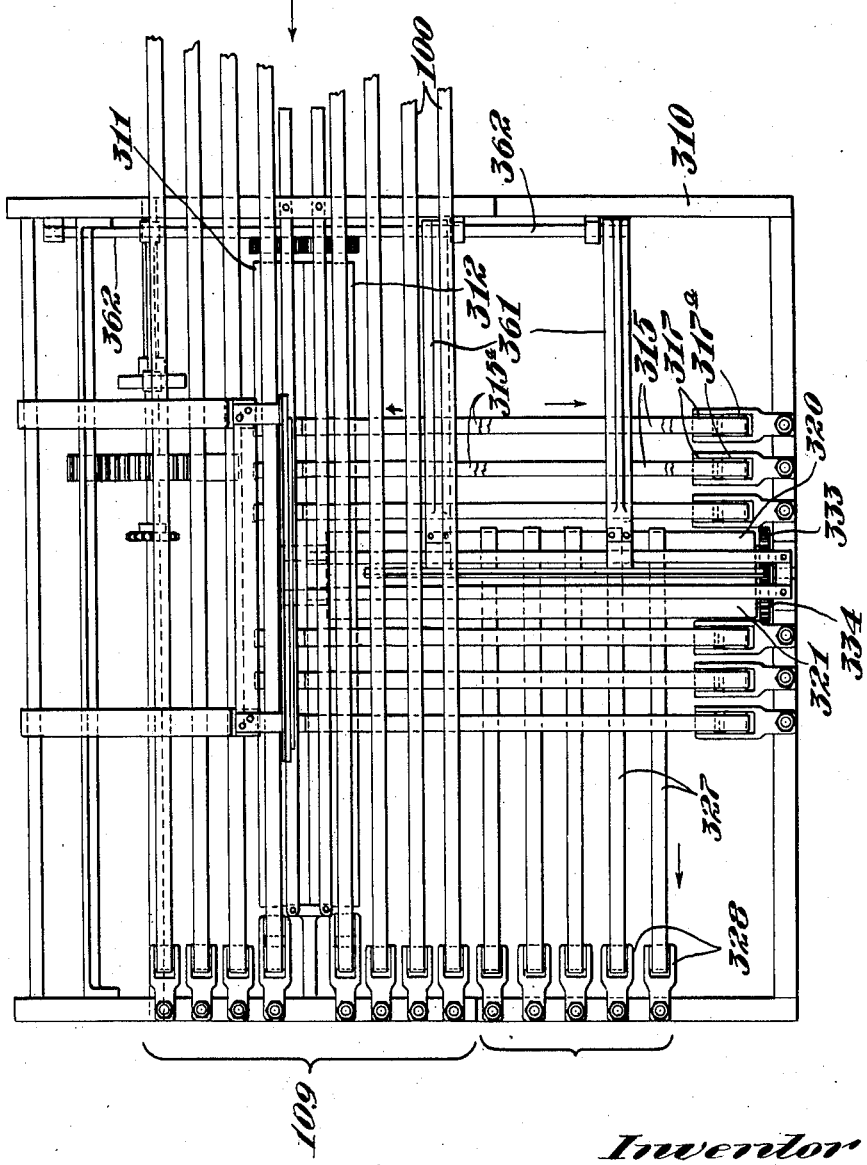

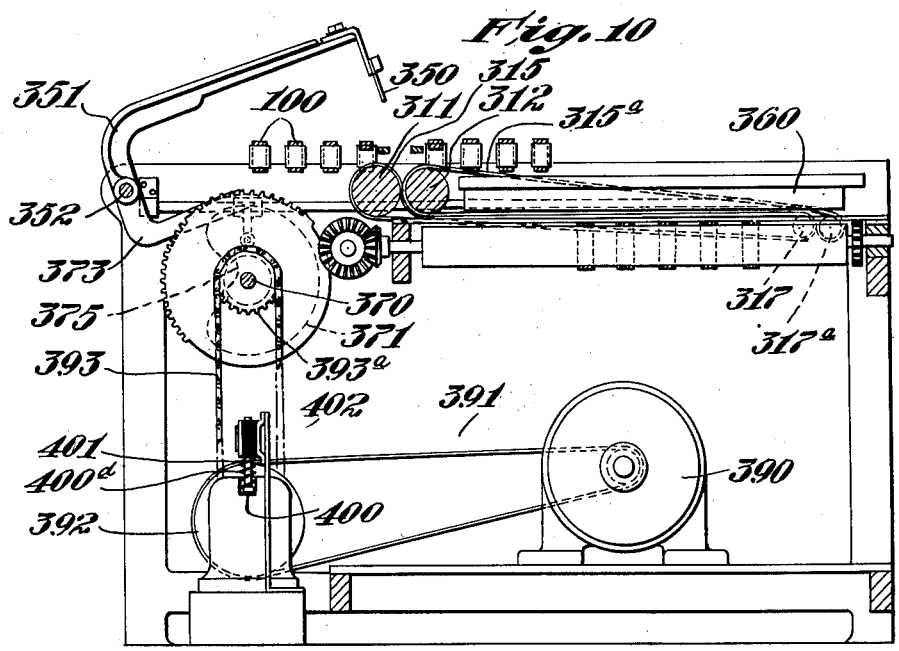
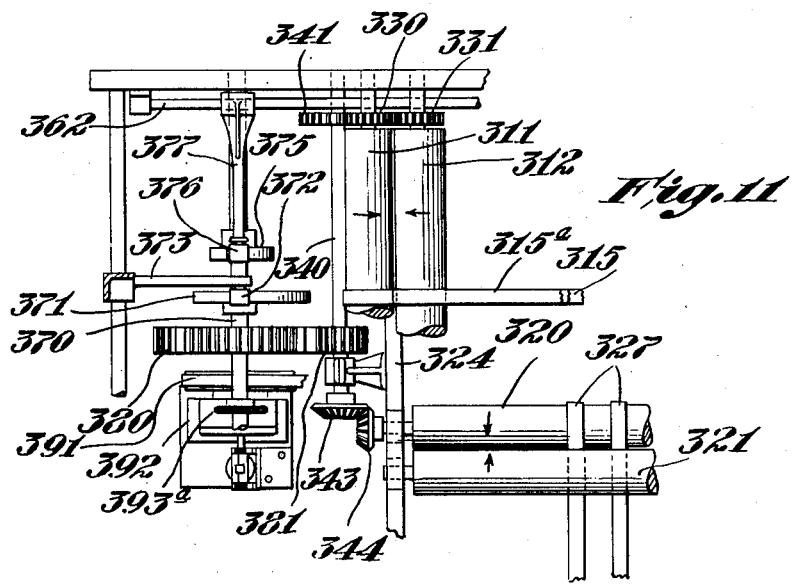

UNITED STATES PATENT OFFICE 1,960,404

LAUNDRY MACHINERY

Frederick T. Allen, Cambridge, Mass.

Application October 21, 1931, Serial No. 570,069

25 Claims. (Cl. 68—9)

This invention relates to ironing or ironing and folding machines and is of special applicability to machines adapted to handle flatwork such as sheets, tablecloths, napkins and the like. For convenience, an article handled by the machine will be referred to as a "piece".

As well known in laundry operation, pieces already washed come from the washing and drying devices in the form of moist balls which are then individually shaken out by hand preparatory to ironing. The shaking out of these moist pieces is a relatively slow operation compared with the proper speed at which the pieces should be supplied to the ironing mechanism if the ironing mechanism is to be run at its maximum capacity. The situation is usually such that a single helper or operator can not perform the necessary manual operations of shaking out and feeding at a rate sufficient to keep an uninterrupted procession of closely spaced pieces feeding into the ironing machine.

In order to avoid an undesirably low productivity of the ironing machine, it has heretofore been customary to employ for each operator who places the pieces in the machine, at least two helpers to assist by shaking out and piling up the moist pieces. This mode of operation has the disadvantage of unnecessary handling of each piece by two operators; it furthermore involves a lack of systematic timing of the shaking out and feeding operations, so that the rate at which the pieces are supplied into the machine may vary considerably and frequently drop below a satisfactory rate.

The present invention aims to facilitate and render practical the simultaneous or concomitant supply of the pieces in a procession by a plurality of operators, each of whom tends to the shaking out of the pieces which she respectively feeds. It is an object of this invention to provide an ironing machine with piece-receiving traveling mechanism arranged to receive at different points, and from different operators, pieces to be ironed in a longitudinal procession; it is a further object to provide for receiving pieces from the several operators in such a way that a closely and uniformly spaced procession of pieces will be formed. Another object of the invention is to provide for timing a folding mechanism accurately in respect to the concomitant acts of feeding pieces by a plurality of different operators, so that all of the pieces ironed will be folded accurately and identically irrespective of which operator places them in the traveling procession of pieces.

Another object of the invention is to provide an ironing machine with traveling piece carrying elements presented in succession to a plurality of operators standing one behind the other at the receiving end of the machine; to do this without requiring the operators to stand to one side of the traveling piece carrying elements of the machine, or to face in any direction other than the direction of progress of pieces to and through the machine; and to provide for accommodating a plurality of operators each enabled to feed to a common longitudinal procession without interference with the one or more other operators doing likewise.

It will be understood that conventional laundry practice in the ironing of small and sometimes large pieces often involves the use of a very wide ironing bed capable of ironing a plurality of longitudinal processions of pieces simultaneously; this affords considerable economy of space, investment cost and operating expense. Through such a wide ironing bed there pass several parallel processions of pieces to be ironed, each procession being fed by a single operator since more than a single feeding operator for a given procession of pieces would in the ordinary ironing machine result in crowding or interference and would necessitate spacing the several processions unduly widthwise when narrow pieces are ironed. The present invention aims to provide ironing mechanism of the wide bed type wherein the several processions of pieces can be spaced closely together (so as to utilize to a maximum extent the width of the bed) and wherein each procession of pieces can be made up by a plurality of operators working without interference with each other.

An object of the invention is therefore to provide an ironing machine wherein the conveying devices which initially engage the pieces of a given procession travel to a plurality of stations at which pieces may be presented thereto; and to do this by apparatus which occupies a minimum of width.

Another object of the invention is to provide a fabric treating machine with piece-edge holding devices traveling in a procession, and mechanism adapted to cause the engagement of some of these holding devices at one part of their travel with pieces to be ironed, and to cause the engagement of other of the holding devices at another part of their travel, thereby rendering possible the automatic engagement of pieces at different stations.

A further object of the invention is to provide improved automatically operating devices adapted to receive a piece shaken out by the operator and adapted to discharge the piece into engaging relation to the traveling or conveying mechanism of the ironing machine; and further to time the operation of a plurality of such piece-receiving and discharging devices in relation to each other and to the passage of the traveling piece conveying mechanism, so as to provide in the bed of the machine a continuous evenly and closely spaced procession of pieces.

Other objects of the invention and features of novelty and advantage will be apparent from this specification and drawings wherein one specific instance of my invention is explained by way of example.

In the drawings:

Fig. 1 is a side elevation, partly diagrammatic of a machine according to my invention adapted to iron and fold flat work;

Fig. 2 is a plan view, to a larger scale than Fig. 1, of the right hand end of the machine;

Fig. 3 is a side elevation of the portion of the machine shown in Fig. 2;

Figure 6:
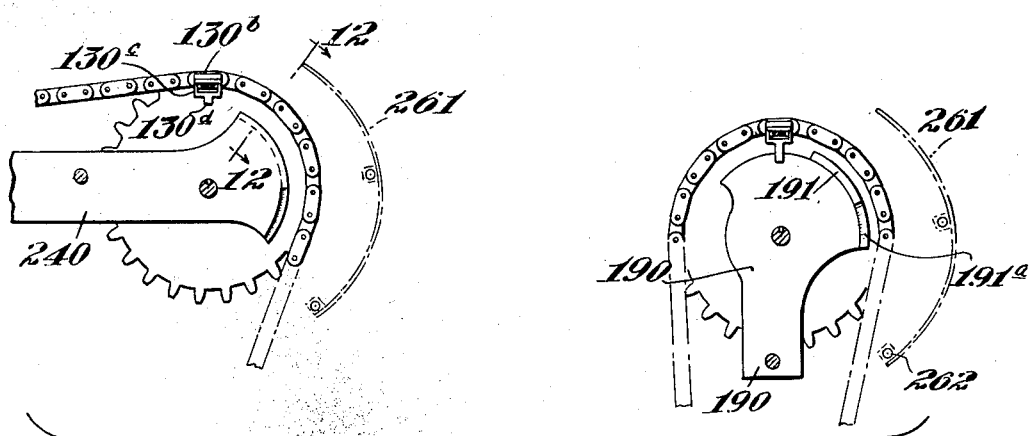
Figure 7:
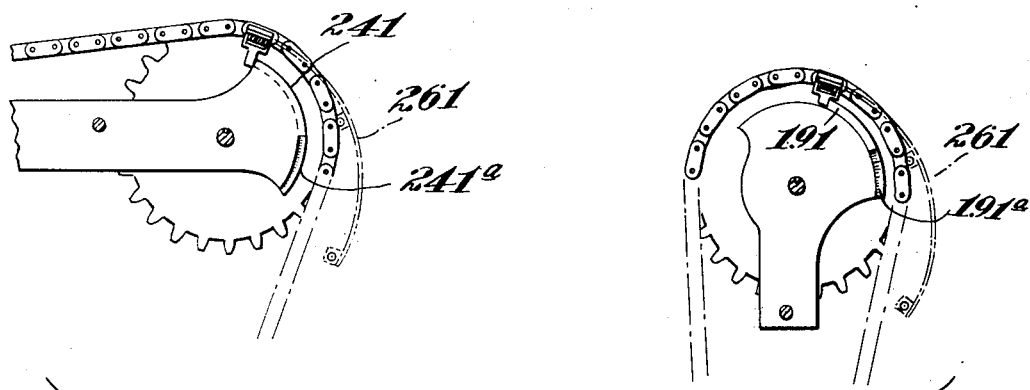
Figures 12, 12A:
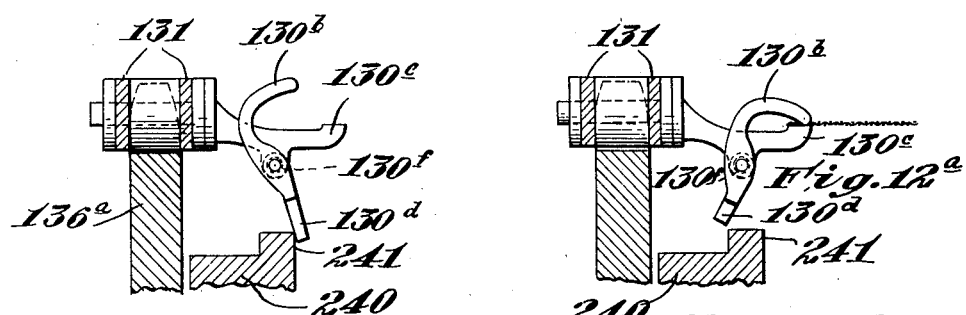

Fig. 3$^a$ is a fragmentary plan view of certain mechanical connections shown in Fig. 3;

Fig. 4 is a fragmentary plan view showing the extreme right portion of the machine, this view differing from the corresponding part of Fig. 2 by showing the movable piece holding and delivering platform of that portion of the machine in the act of delivering a piece to the traveling conveying mechanism;

Fig. 5 is a vertical section on the line 5—5 of Fig. 3;

Fig. 6 is a diagrammatic view in the nature of a longitudinal vertical section illustrating parts of the traveling conveying mechanism at which pieces are received, and showing the movable piece holding and delivering platforms moved away from the conveying mechanism;

Fig. 7 is a diagrammatic section like Fig. 6 but illustrating the movable piece holding and delivering platforms moved into position for traveling piece-edge holding devices to engage the pieces thereon. Figs. 6 and 7 show also the means whereby piece edge holding devices of the machine are operated to engage the pieces at different places in their path of travel;

Figs. 8 and 8$^a$ are diagrammatic views illustrating the mechanism for timing the piece folding mechanism of the machine;

Fig. 9 is a plan view of a unit of folding mechanism of the machine;

Fig. 10 is a vertical section on the line 10—10 of Fig. 9, transverse to the general path of pieces through the machine;

Fig. 11 is a fragmentary view in plan of parts of the folding mechanism of Fig. 9, this view omitting certain of the conveying tapes which cover the folding rollers;

Fig. 12 is a fragmentary radial section on the line 12—12 of Fig. 6, showing one of the longer-tailed clips of the machine held open for the reception of a piece to be ironed; and Fig. 12$^a$ is a view like Fig. 12, but showing one of the shorter tailed clips which has already been provided with a piece at a preceding station of the machine.

The invention will be explained by way of example as embodied in ironing apparatus for laundries having in combination a mangle, folding mechanism operable on the pieces ironed by the mangle and conveying mechanism adapted to carry moist pieces from the operators who shake them out, to and through the ironing apparatus and to the folding mechanism. Referring to Fig. 1 the mangle indicated therein at 20 may for example include a hollow heated chest or bed 21 having an undulated upper surface into which are fitted a plurality of driven rotating rolls 22 to 27, inclusive, preferably covered with some suitable blanket material. These mangle rolls are driven in a direction to carry pieces from right to left of the illustrated mangle by means of a motor 30 operating through a chain 31, sprocket 32, shaft 33 and intermeshing gear wheels 34, 35. Gear wheel 35 is illustrated as meshing with gear wheels 36 and 37 which are respectively fast upon the drive shafts of mangle rolls 24 and 25. As is customary in the construction of mangles, each of the other mangle rolls carries a similar gear wheel, indicated diagrammatically in Fig. 1 and these gear wheels of adjacent rolls are interconnected by idler gear wheels indicated at 39, 40, 41 and 42.

The conveying mechanism for carrying pieces to be ironed to and through the mangle and to the folding mechanism may include in addition to the initial carrier to be described more fully below, parallel series of tapes 50, 51, 52, 53 and 54 passing about suitable pulleys 50$^a$, 51$^a$, 52$^a$, 53$^a$ and 54$^a$ on a shaft 58 (Figs. 2 and 3) and passing about a flat approximately horizontally extending table 59 which slightly overhangs the extreme upper right hand edge 60 of the heated bed of the mangle. Supplementing the action of these tapes there are preferably provided a pair of outer tapes 62, 63 which pass over the upper surface of table 59, along its under surface, thence down over a horizontal guide rod 65, thence downward to and around pulleys 66, and upward to the right hand edge of table 59, in a continuous path. The function of these tapes 50–54, inclusive, and 62 and 63 is to deliver to the hot bed of the mangle at a point close to the nip between roll 27 and the hot bed, the procession of pieces which have been previously delivered to the initial portion of the carrier mechanism hereinbelow described.

The machine preferably includes, as part of the piece-conveying mechanism acting in conjunction with the driven rolls 22 to 27, an apron 84 of canvas or the like running between these rolls and the heated bed 21 and adapted to hold the pieces in contact with the bed. This traveling apron, serves to prevent the pieces from rolling up on the several mangle rolls, and prevents wrinkling. Referring to Fig. 1, the left or discharge end of the mangle may carry a pair of slotted brackets, one of which is indicated at 80 in Fig. 1, the brackets carrying a transversely extending apron roll 81 between them in any suitable adjustable supports. The apron 84 may run over this roll 80, thence to the right of the machine, around the first mangle roll 27, and from thence along the upper surface of the bed 21 to its left end under each of the mangle rolls. Pieces discharged to the nip point of roll 27 by the traveling tapes 50—54 and 62, 63, pass directly under the apron 84 and are transported by frictional contact therewith the entire length of the bed.

I prefer to utilize the lower smooth surface 83 of the hot bed 21 for continued drying action on the once-ironed pieces. For this purpose, the apron may run about the curved left end of the bed 21, thence along the lower surface 83, holding the ironed pieces in contact therewith, thence over and around a driven roll 86 (Figs. 3 and 3$^a$) at the right end of the machine. From this point the apron may return to the left end of the mangle, under an idler roll 87 and up to the previously described roll 81, as shown in Fig. 1.

The apron 84 is shown as maintained at a speed timed in relation to the other conveying elements of the machine by a chain of gearing comprised of the right hand idler roll 42 of the mangle, the gear 89, the gear 90, shaft 91, the gear 92 (Fig. 3ᵃ) and finally a gear 93 fast on the shaft 94 which carries this roll 86. The apron is also in frictional contact with each of the mangle rolls 22 to 27, inclusive, and hence travels at their surface speed.

Upon passing over the roll 86 the pieces which have been carried on the right under the hot bed are engaged by a plurality of traveling tapes 100 which pass upward, over and around a pulley 101, thence around roll 86 and to the left hand end of the mangle under the roll 87, accompanying the apron 84 from the roll 86 to the roll 87; during this time the pieces travel to the left between the apron 84 and tapes 100.

The tapes 100 after passing the roll 87 and leaving the apron 84, pass into the folding mechanism particularly indicated in Figs. 9 and 10, and after passing across the folding bed run about a series of separate pulleys 109 and thence return, moving to the right in Figs. 1 and 3, under an idler roll or bar 110 and a second idler roll 111 back to the roll 101. The roll 101 acting to drive these tapes may be geared to the roll 86 by means of a gear 114 which meshes with previously described gear 93.

So much of the piece conveying mechanism of the machine as has now been described is driven in timed relation to the rolls of the mangle.

The initial portion of the piece conveying mechanism may now by way of example be described as arranged to enable two operators to perform the duties heretofore usually assigned to three operators in shaking out the moist pieces which have been washed and supplying them to a procession of pieces carried through the machine.

For these purposes the initial portion of the conveying mechanism in the machine is so formed as to accommodate two feeding operators who may stand in prolongation of the path of travel of the procession of articles through the machine, and at different points, one behind the other. Each of these operators may have before her a supply of the moist pieces; she can then shake out an individual piece, and when this is done, allow the piece to be carried into the mangle without any handling of this piece by the other operator. There is thus no second handling of each piece as heretofore customary. The conveyor illustrated herewith is adapted to run from one such operator to another in its travel toward the ironing bed, and is adapted to engage and carry the pieces independently positioned by the two operators severally without any interference between them and in such a way as to provide a procession of closely spaced articles passing into the hot bed at definite intervals.

By way of example this initial portion of the conveying mechanism is shown in its preferred form as comprising opposed series of piece edge holding devices traveling in an endless path past the several operators to a position to discharge onto the tapes 50 to 54, inclusive, and thence return. As indicated in Figs. 2 and 3, the forward end of the machine may have extending in prolongation of the path of travel of the articles through the bed a frame work comprising uprights 120, 121, 122 and 123, and horizontal members 124 and 126, each on both sides of this portion of the machine together with suitable transverse members adapted to make a rigid framework. A suitable flooring 129 is preferably laid across the two longitudinal frame members 126; this provides a station for one feeding operator; the other feeding operator may stand at the extreme right end of the machine. It will be obvious that the principles of this invention can be embodied in a machine provided with any suitable number of places or stations for operators.

The traveling piece edge holding devices employed to carry the pieces from the plurality of operators, preferably are in the form of clips 130 which may, for example, be of any type employed in tentering machines, adapted to grasp and hold the edges of the pieces. These clips 130, shown in Fig. 2, are oppositely directed so as to face each other and preferably are carried by opposed endless chains 131 and 132 passing over suitable sprocket wheels carried in the framework above described.

The course of travel of these endless chains and their clips 130, to enable the clips to be presented to the plurality of operators standing one behind the other directly behind the mangle, will now be described.

Starting at the extreme right hand end of the machine, there is preferably provided a cross shaft 135 carrying at a spaced distance greater than the width of the pieces to be ironed a pair of sprocket wheels 136 and 137. The endless chains 131, 132 and their clips 130 pass generally upward in the direction of arrow y in Fig. 3, over these sprocket wheels, thence vertically downward, under idler sprockets 139, horizontally to the left under the floor 129 and other idler sprockets 140, and thence upward in the direction of the arrow y'. At about the working height of an operator the chains 131, 132 pass over other sprocket wheels 136ᵃ and 137ᵃ, similar to the sprocket wheels 136 and 137, and thence travel slightly downwardly in a plane coincident with that of the upper run of the tapes 50 to 54. After traveling in the plane of these tapes for a short distance, usually equal at least to the length of the pieces to be ironed, the chains pass about sprocket wheels 145 and 146 on a driven shaft 148, Figs. 2 and 3, thence downwardly, under pairs of idler sprockets 150 and 151, Fig. 3, and thence upwardly again to the sprocket wheels 136 and 137. It will be understood that a preferred level for the chains to turn about the sprocket wheels 136, 137, 136ᵃ and 137ᵃ is about the waist height of an operator. Since the operator standing on floor 129 is at a somewhat higher level than the other operator, sprocket wheels 136ᵃ and 137ᵃ are correspondingly raised. As the clips 130 pass over the sprocket wheels 136, 137, 136ᵃ and 137ᵃ pieces of flat goods to be ironed are fed thereto, under the attention of the respective operators.

It has been described how the two endless chains 131 and 132 pass over sprocket wheels 145 and 146 on driven shaft 148. This shaft preferably carries at its end a sprocket wheel 160 which is engaged by a chain 161 passing about a sprocket 162 fast on driven shaft 91 of the gear 90 of the mangle, passing also about an idler sprocket 163, (Fig. 3). The effect of this is to drive the endless chains 131 and 132 and their clips in timed relation to all the other conveying devices of the machine, preferably at the same speed as the mangle apron 84 and the tapes 100 which carry the pieces into the folding mechanism. The tapes 50 to 54 which receive the pieces from the traveling clips are preferably driven through a connection comprised of a sprocket 170 on shaft 148, (Fig. 2) a chain 171 and a sprocket 172 which is fast on a shaft 173 carrying the pulleys 50ᵃ, 51ᵃ, 52ᵃ, 53ᵃ and 54ᵃ which drive these tapes. The two outside tapes 62 and 63 are also driven in timed relation to the chains and other conveying parts by means of a sprocket 175 turned by the idler sprocket 150, (Fig. 3) a chain 176 and a sprocket 177 which turns the roll 66 driving these two tapes.

It will be understood that the present machine is especially adapted to handle flat work coming in large quantities of identical pieces; for this reason the clips 130 which form the piece edge holding devices are preferably spaced lengthwise on the chains constant distances sufficient to allow a short interval between the rear edge of one piece and the leading edge of the next adjacent piece. The principal mode of operation of the endless chains and their clips may be practiced with any larger number of operators than the two utilized in the present machine. When, however, two operators are employed and the machine is given the form shown in Fig. 3, alternate pairs of the clips are caused to close at the two different operators' stations; preferably in the device of the present drawings, one pair of clips on the chains will close to engage a piece as the chains are passing over the sprocket wheels 136 and 137, (this point may be called station 1); the next pair of clips will close to engage a piece in passing over the sprocket wheels 136ᵃ and 137ᵃ (station 2); and the next adjacent pair will close to engage a piece in passing over the sprocket wheels 136 and 137, (station 1). While any desired form of piece edge holding device such as the clip 130 may be employed, the preferable construction for these devices comprises a lower jaw 130ᵃ fast to one of the links of the chain (removable if desired) and an upper jaw 130ᵇ having downwardly extending arms 130ᶜ which are pivoted to the lower jaw portion of the clip. Any suitable spring 130ᶠ may be employed to urge the movable upper jaw 130ᵇ to close upon the lower jaw 130ᵃ. At the points in the machine at which it is desired to cause certain or all of the clips to be opened, suitable cam mechanism is provided in position to react upon downwardly extending tails (generally indicated by the reference character 130ᵈ) which are integral with the upper movable jaws 130ᵇ of the respective clips. Those pairs of clips destined to receive pieces from the first operator or station have short tails 130ᵈ′ while those alternate pairs of clips destined to receive pieces from the second operator or station have long tails 130ᵈ″.

Referring now to Figs. 2, 6 and 7 suitable cam mechanism for opening the clips as they pass about the sprockets 136 and 137 may comprise opposed stationary cam elements 190 having thereon inwardly directed cam surfaces 191 of arcuate shape; the initial portion 191ᵃ of each of these cam surfaces 191 is inclined as indicated in Figs. 6 and 7 so that when contacted by the tails 130ᵈ′ and 130ᵈ″ of the various clips, these tails will be forced away from the cam member 190 in a direction to open the clips. The clips remain open during the time in which these tails 130ᵈ′ and 130ᵈ″ are passing over the cam surfaces 191. Upon reaching the ends of cam surfaces 191 the tails 130ᵈ′ and 130ᵈ″ are free to return to their normal positions allowing the clips to close upon any pieces which have been suitably positioned to be engaged thereby. It will be understood that in the operation of the machine illustrated, pieces are positioned to be engaged only by alternate pairs of clips as the latter pass over the sprocket wheels 136 and 137, leaving the other clips empty at this point. A timing of the machine such that pairs of clips pass the sprocket wheels 136 and 137 at the rate of thirty per minute enables the operator at a given station to shake out a moist piece and have it ready for presentation to the clips at the rate of fifteen per minute as alternate pairs of clips pass her station.

Pieces thus engaged by clips which close upon them at this first station, then travel with their closed clips. These pieces are initially supported by a plate 138 which is supported by straps 138ᵃ which extend from the frame (Figs. 2, 4 and 5). It is preferable to engage pieces to be conveyed at the margins of their leading edges. As the pieces travel downwardly from the sprocket wheels 136 and 137 it then becomes necessary to hold these pieces in the planes of the two chains and their clips against falling over. For this purpose there are preferably provided two opposed series of endless tapes 200 and 201 passing respectively about sets of pulleys 202 and 203, (Fig. 2) downward runs of these tapes being in contact with the pieces carried by the downwardly traveling chains. The series of tapes 200 preferably run about pulleys 206 (Fig. 3) which are driven by a shaft 207 fast on the idler chain pulley 206, while the series of tapes 201 preferably run about a series of pulleys 208 which are fast on the shaft 209 rotating with the idler chain sprocket 151.

Running horizontally from end to end of the frame is a series of rods 210 upon which the tails of the napkins ride preventing them from dragging on the floor. From sprocket 140, Fig. 3, the pieces hang from the clips by their own weight as they rise.

Upon arriving at the sprocket wheels 136ᵃ and 137ᵃ the alternate pairs of clips which do not already carry pieces are then caused to open. It may be here explained that the clips destined to open at this point are provided with tails 130ᵈ″ of longer length than the corresponding tails of the other clips so that these longer tailed clips can be opened by engagement with cam surfaces which are cleared by the remaining clips already carrying pieces. Referring to Figs. 2, 6 and 7 there preferably extends from each of the sprocket wheels 136ᵃ and 137ᵃ, toward the left a casting 240, the castings associated with each of the two sprocket wheels being symmetrical but reversed. Each of these castings 240 carries at its right hand end an arcuate cam surface 241 (Figs. 2, 6 and 7) having an inclined portion 241ᵃ, and located at a distance from the axis of the sprocket wheel such that its surfaces 241 and 241ᵃ are engaged only by the long tails of the alternate clips. Those short-tailed clips already carrying pieces are totally free from these cam surfaces 241 and 241ᵃ, whereas the long-tailed clips which are empty at this point are caused to open in the same manner as at the cam surface 191 previously described. In Fig. 12 it is shown how a longer-tailed clip opens, while in Fig. 12ᵃ it is shown how a shorter-tailed clip already carrying a piece remains closed. Upon reaching the end of the cam surface 241 these long-tailed clips automatically close by spring action, as indicated in Fig. 7, and engage pieces which have been positioned to be grasped by their opposed jaws. In the operation of the illustrated machine the operator at this second station will shake out a piece and have it ready to be grasped by the closing long-tailed clips at the rate of fifteen per minute, thus filling the gaps left in the procession of the pieces by the first operator.

Suitably to support the procession of pieces as it leaves the sprocket wheels 136ª and 137ª, there is preferably provided a transverse frame member 250 (Fig. 2) carrying rods 251 extending longitudinally of the machine slightly below the plane of the clips. From these rods 251 suitable guide wires 252 preferably extend in prolongation thereof and run between the traveling tapes 50 to 54, inclusive. The rods 251, the guide wires 252 and the tapes 50 to 54, inclusive, thus support the conveyed procession of pieces.

Before the pieces of the procession are engaged by the mangle rolls, it is desirable that they should be pulled out laterally to their full width. For this purpose the traveling chains 131 and 132 are preferably caused to diverge to some extent in passing from the sprockets 136ª and 137ª to the sprockets 145 and 146.

Upon reaching the sprockets 145 and 146 all of the clips whether they have short or long tails are preferably caused to open at approximately the same point in order to discharge their pieces onto tapes 50 to 54, 62 and 63. For accomplishing this, the castings 240 are preferably provided with inwardly inclined raised cam surfaces 255 (Fig. 2) extending sufficiently close to the body portions of the clips to force the tails of all of the clips inwardly, thus freeing the carried pieces from the jaws of the clips. From thence the procession of pieces is carried at a slightly slower rate of travel by the tapes 50 to 54, inclusive, and the outer tapes 62 and 63, into the mangle. As the pieces contact with tapes 50 to 54 before being released by the clips, the slightly slower traveling tapes exert a slight drag on the pieces, thus straightening them out lengthwise. The clips, after leaving the cam surfaces 255, again close and return to the first feeding station of the machine where the short-tailed clips are supplied with pieces, and to the second station of the machine where the long-tailed clips are supplied with pieces, as described above.

To facilitate the supply of pieces to the traveling piece edge holders or clips at the respective stations, there are preferably provided movable piece supporting and discharging platforms adapted to move into the plane of the jaws of the clips to discharge, and to move out of the plane of the jaws, to receive a fresh piece opened by the operator. This motion out of the plane of the jaws also permits the pieces coming from the first operator or station to pass the piece-discharging platform of the second station. Referring to Figs. 2, 3, 4 and 5, such platforms preferably are in the form of adjacent curved sheets of metal 260, 261 pivotally mounted at their lower ends upon a stationary cross rod 262 (Figs. 2, 3 and 6) and adapted to be swung together about this rod so that their upper edges move into and out of the plane of the clips passing over the sprocket wheels 136 and 137. For moving plates 260, 261 in this manner there is preferably provided on the shaft 135 which turns with the sprocket wheels 136, 137, a crank arm 270 connected by a link 271 to a cross rod 272 fastened to the two plates 260, 261. The crank arm 270 and link 271 just described are preferably duplicated on the opposite side of the machine. Each revolution of the shaft 135 and sprocket wheels 136 and 137 therefore moves the upper edges of the plates 260 and 261 of this platform through a complete cycle to and away from the plane of the clips. The movable platform thus constituted is adapted to hold a moist piece just shaken out by the operator and placed thereon. For more adequately holding such a piece against sliding off, the forward portions of this movable platform are preferably provided with a surface adapted to resist sliding, preferably a surface formed by the attachment of narrow strips of card clothing 261ª which leaves the positioned piece quite free to be pulled off forwardly when engaged by the clips.

For adjusting the aggregate width of the platform comprised of plates 260, 261, these plates preferably carry on their lower surfaces pairs of blocks 273 and 274, respectively, these pairs of blocks being internally screw-threaded with threads of respectively opposite inclination. The rod 262, which is rotatable, is correspondingly oppositely threaded along its two halves; thus by rotating the rod 262 the plates 260 and 261 attached to the pairs of blocks 273, 274 can be caused to approach or separate, thereby increasing or decreasing the aggregate width of the platform.

It has been explained how the piece holding and discharging platform comprised of the plates 260 and 261 is moved into the plane of the traveling clips to discharge a piece thereto. To enable the piece about to be grasped by the clips to be supported as adequately as possible at the time of engagement by the clips, the platforms 260, 261 are preferably adjusted to approximately the same width as the pieces to be handled, a width somewhat wider than the space between the two adjacent clips on the opposite chains. To prevent interference between the clips and this platform, and also to provide free unsupported portions of the piece in position to be grasped by the clips, the two forward corners of the platform are preferably cut away, as indicated at 280 in Fig. 2. The portions of the piece to be fed which overlie these cut out corners of the platform are thus free to be grasped by the passing clips.

The second feeding station located at the sprocket wheels 136ª and 137ª is provided with a piece holding and discharging platform substantially identical with that just described and no further description of the construction of this second platform need be given.

Figs. 6 and 7 illustrate the timing of operation of the two piece discharging platforms and of the traveling clips. In Fig. 6 the two platforms are shown as swung back away from the traveling chain in position to receive pieces from their respective operators. During this time a long-tailed pair of clips is passing the first station, in an empty condition, while a short-tailed pair of clips is passing the second station carrying a piece which has been fed thereto at the first station.

In Fig. 7 the two-piece discharging platforms are shown as having been simultaneously moved to bring the forward edges of pieces held thereon into the plane of the traveling clips. A short-tailed pair of clips have just passed the cam surfaces 191 at station 1 and closed to grasp the piece positioned by the platform. At station 2 a long-tailed pair of clips has just left the cam surface 241 and has closed in like manner upon a piece positioned by the platform at that station.

Means is also provided for adjusting this portion of the machine for pieces of different width. Referring to Fig. 5 the cam elements 190, which carry the cam surfaces 191 adapted to open the clips in passing the sprockets 136, 137, are slidable axially of the shaft 135 to which these sprockets are splined. Depending portions of these cam elements 190 are threaded to receive a screw rod 290 having oppositely inclined threaded portions thereon. This rod 290 is adapted to turn in opposite frame elements 123 of the machine and to be rotated by a hand wheel 290ª, so that rotation of this hand wheel can move the cam members 190 in opposite directions toward or away from each other. The sprockets 136, 137 are splined to the shaft 135 so as to be movable in accordance with movements of the cam elements 190, thus to adjust the distance between the opposite endless chains 131, 132. The sprockets 136ª and 137ª are likewise slidable axially on their shaft 135ª, and the sprockets 145 and 146 are also axially slidable on their shaft 148.

The two castings 240 carrying the cam surfaces 241 and 255 may be moved toward or away from each other, by the action of both of two screw rods 291 and 292 having oppositely threaded portions threaded into the two castings 240. Screw rod 292 is caused to move in unison with screw rod 291 by the provision of sprockets 294 and 295 on these respective rods, these sprockets being connected by a suitable endless chain 297. The outer end of screw rod 291 carries a hand wheel 298, thus adapted to turn rods 291 and 292 simultaneously to move the two castings 240 either closer or farther apart.

The construction of the folding mechanism employed may be subject to wide variation, the most important feature relating to the folding mechanism being the control and timing of the folding mechanism in relation to the supply of pieces to the conveying mechanism and to the travel of these pieces through the ironing mechanism. It is an object of this invention so to control and time the operations of the folding mechanism as to insure identical folding of pieces regardless of the particular station at which the pieces are supplied to the machine.

Referring to Figs. 9, 10 and 11, the folding mechanism may have journalled in its frame 310 a pair of longitudinal folding rolls 311, 312 suitably geared together, and so positioned that the nip line of these rolls lies just below the space between the middle pair of the tapes 100 extending from the mangle. A suitable plurality of transverse conveying tapes 315 run over longitudinal folding roll 311, under longitudinal roll 312, to the right in the direction of the arrow $k$ in Fig. 9, about suitable pulleys 317, and from thence return to longitudinal folding roll 311. The function of these tapes, which are driven by the longitudinal folding roll 311, is to carry pieces which have passed between the rolls 311, 312, to the right, in a folded state, in position to be passed between transverse folding rolls 320, 321. These transverse folding rolls 320 and 321 are also journalled in the frame 310 at one end and at their opposite end in a transverse supporting member 324, attached to the frame. It will be understood that in passing between the transverse folding rolls 320, 321 the already oncefolded pieces receive a second fold in the opposite direction. The transverse tapes 315, which support the pieces from beneath, are preferably supplemented by a corresponding series of transverse tapes 315ª which overlie the pieces, passing to the left, over and around roll 312, thence to the right over pulleys 317, around a second series of pulleys 317ª and thence return the roll 312. The pieces are thus securely held between upper and lower series of tapes, thereby preventing slipping or twisting. A suitable plurality of longitudinal conveying tapes 327 pass over the transverse folding roll 327 under the companion roll 321, longitudinally of the machine to the end of the folding device, around suitable pulleys 328, and thence return to the transverse roll 327. These tapes serve to discharge pieces which have been twice folded.

Longitudinal folding rolls 311, 312 are geared together by intermeshing gears 330, 331 (Fig. 11), and transverse folding rolls 320 and 321 are geared together by intermeshing gears 333, 334 (Fig. 9). The simultaneous operation of all four of the folding rolls is assured by a suitable gear connection between them, such for example as afforded by the shaft 340 carrying at one end a gear 341 which meshes with gear 330 on roll 311, and carrying at its other end a beveled gear 343 meshing with a similar beveled gear 344 on roll 320. The transverse tapes 315 and the longitudinal tapes 327 move at the same speeds as these folding rollers, due to their frictional engagement with the rolls 311 and 320 respectively.

It will be understood that the tapes 100 leading from the mangle are so positioned at the mangle as to receive the procession of ironed pieces with the individual pieces aligned centrally of the total width of this series of tapes; this brings the pieces with their center lines directly over the nip line between the rolls 311, 312. For forcing the individual pieces down between the middle two of the tapes 100 and into engagement with the rolls 311, 312, there is provided a folder blade 350 carried by an arm 351 which is pivotally mounted to the frame at 352. The same function is performed in relation to the pieces transported on transverse tapes 315 by a transversely disposed folder blade 360 (Fig. 9) carried at the end of arms 361, which in turn are fast upon a shaft 362 which is journaled on the frame. A main cam shaft 370 carries a lifter cam 371 (Fig. 11) adapted to raise and lower a cam follower 372 which is carried by an arm 373 fast on the arm 351 which carries the folder blade 350. Another cam 375 on the cam shaft 370 is adapted to raise and lower cam follower 376 carried by an arc 377 fast on the rotatable shaft 362 which operates the transverse folder blade 360. Thus rotation of the cam shaft 370 operates the two folder blades 350 and 360 in timed relation, preferably at the same time.

The cam shaft 370 is also utilized to drive the folding rolls by the provision on this shaft of a mutilated gear 380 having teeth around half of its circumference, and meshing with a gear 381 (Fig. 11) of one-fourth its diameter on shaft 340.

Referring to Fig. 10 the folding unit is shown as driven by a separate motor 390 connected by a belt 391 to a suitable clutch 392; clutch 392 in turn is connected by a chain 393 to a suitable sprocket 393ª fast on cam shaft 370. Clutch 392 may be any suitable clutch adapted to cause the chain 393 to rotate the shaft 370 through a single revolution and then stop; several such one-revolution clutches are already well known and hence the specific construction need not be described in detail. The clutch 392, it will be understood, is normally disconnected so that the motor 390 runs without driving the cam shaft 370. Any suitable controlling lever 400 may extend into the clutch casing and at its outer end be connected to a lift rod 401 which is connected to the movable armature of a solenoid 402, conveniently mounted adjacent to the casing of the clutch 392.

Raising of the lift rod 401 and operating lever 400 of the clutch by actuation of the solenoid allows the clutch to engage for a period corresponding to one revolution of the driving shaft 370, the clutch being a one revolution clutch which automatically disengages itself at the end of this operation.

In the illustrated machine the one-revolution clutch 292, which may be of any desired construction, resembles that shown in Fig. 23 of United States Patent No. 1,156,672, and that shown in Figs. 19 and 20 of my application, Serial No. 453,242, filed May 17, 1930. As indicated diagrammatically in Figs. 8 and 8ª, the belt 391 coming from the motor 390 drives a pulley 391ª, a shaft 391ᵇ and a ratchet wheel 391ᶜ. A sprocket wheel 393ᶜ, freely mounted on shaft 391ᵇ, is connected to the chain 393 which intermittently operates the folding mechanism; when the clutch is inactive, this sprocket wheel is stationary, while the ratchet wheel 391ᶜ turns. A pawl 391ᵉ pivotally associated with the sprocket wheel 393ᶜ, is normally urged by a spring 391ᶠ toward engagement with the ratchet wheel 391ᶜ. The controlling lever 400, pivoted at 400ª is provided with a downwardly extending crank arm 400ᵇ, carrying at its lower end a block 400ᶜ adapted to exert a cam action on the pawl 391ᵉ, to disengage the latter from the ratchet wheel 391ᶜ. Actuation of the solenoid 402, and upward movement of lift rod 401 disengages the block 400ᶜ from the pawl, permits the pawl to engage the ratchet wheel and allows sprocket wheel 393ᶜ to be driven. The block 400ᶜ is then returned into the path of the pawl by means of a spring 400ᵈ, whereupon the pawl is disengaged from the ratchet wheel, and the sprocket 393ᶜ stopped at the end of one complete revolution.

Referring to Figs. 1 and 8, the solenoid 402 is shown as connected to a suitable supply of operating current 403 and thence by wires extending to the right-hand end of the machine to a suitable commutator 404 which operates in timed relation to the travel of the chains 131, 132.

The preferred construction for this commutator is shown in Fig. 8 as including a disk 406 mounted at the extremity of shaft 135 and carrying on its periphery a diametrically disposed pair of contacts 408, these contacts being insulated from the disk 406 in any suitable way. A plate 410 loosely mounted to turn at its upper end about shaft 135 is provided with an arcuate slot 411 so that this plate may be swung to various angular positions about the shaft 135 and in relation to the rotating disk 406, being secured in any desired position by a stud bolt 412 which passes through slot 411. This adjustable plate 410 is provided with an insulated bracket 415 carrying a pair of spring contacts 416 which are connected by the electrical connection shown in Fig. 8 to the current supply and to the solenoid 402. Rotation of the disk 406 and its contacts 408 causes the contacts 408 to close the circuit across contacts 416 twice during each revolution of the shaft 135, thus operating the solenoid 402 once each time a pair of clips passes a given point in the machine. The operation of the solenoid 402 effects an operation of the folding mechanism as described above.

This manner of timing the folding mechanism in relation to the conveying and other traveling parts of the machine insures that each piece placed in the machine, at either station will be folded identically. The successive pairs of opposed clips on the chains 131, 132 serve as means to indicate or determine the location at which the leading edge of each piece should be placed on the conveying chain, and the automatically operating discharging platforms described above act to bring the leading edges of the respective pieces into these predetermined locations on the conveying chain. By timing the folding mechanism to operate in accordance with the travel of the conveying chains as just described, and by causing the travel of the pieces to and through the mangle and to the folding mechanism to be at a substantially constant speed, it is assured that a piece placed on the conveyor chain at either station will be accurately folded.

The movable plate 410 may be adjusted by rotating it, so that actuation of the folding device will take place at exactly the instant each ironed piece of the procession has its transverse center line opposite the nip line between the transverse folding rolls 333 and 334, so that pieces will be folded exactly on their center lines.

The capability of the machine to have its timing adjusted in this manner permits the accurate folding of pieces of different length by a slight adjustment of the movable plate 415. If longer pieces are to be ironed and folded, the operation of the folding device can be delayed slightly in relation to the travel of the conveyor chains by adjusting the movable plate 415 a suitable amount; the necessary adjustment can easily be made to cause the center lines of either longer or shorter pieces to lie at the nip line between rolls 333 and 334 at the instant of operation of the folding mechanism.

It should be understood that the present disclosure is for the purpose of illustration only and that this invention includes all modifications and equivalents which fall within the scope of the appended claims.

I claim:

1. An ironing machine having therein an ironing bed, and means for moving pieces to be ironed in a procession into and through said bed, said means including an endless conveyor disposed in prolongation of the path of travel through said bed and having a depressed run in its travel toward the bed and intermediate its ends of path of travel, so as to provide a space above the depressed run suitable to be occupied by an operator intermediate the ends of the path of travel of said conveyor.

2. An ironing machine including an ironing bed, and means for conveying pieces into and through the bed, said conveying means including a traveling carrier accessible at different locations longitudinally of its course to receive pieces to be ironed, in combination with means acting to predetermine the spacing on the carrier of pieces supplied thereto at said different locations.

3. Laundry machinery comprising in combination an ironing device, traveling conveying means for carrying pieces to be ironed to and through said ironing device, a folding device including means for folding pieces thus ironed on a line transverse to the direction of progress of the pieces through the ironing device, means indicative of equally spaced lengths on said conveying means, for determining the placing of forward edges of pieces thereon in spaced relation, means for timing the operation of the transverse folding means in relation to the travel of said conveying means, and means for effecting relative adjustment of such timing to accommodate the transverse folding operation to pieces of different lengths.

4. In combination, folding mechanism, traveling conveyor mechanism adapted to present pieces to be folded to said folding mechanism, means indicative of predetermined spaced lengths on said conveying means whereby to determine the placing of pieces thereon at predetermined spacing, means for causing operation of the folding mechanism to take place in timed relation to the rate of advance of said conveyor mechanism, and means for advancing the timing of one of said mechanisms in relation to the other to accommodate the folding operation to pieces of different lengths.

5. Laundry apparatus for flat work comprising in combination, traveling piece conveying mechanism, ironing mechanism and piece folding mechanism associated to engage with and operate on flat work pieces in the order named, the traveling conveying mechanism being accessible at a plurality of supply stations in succession in its course, so that a procession of pieces to be ironed and folded can be fed to said conveying mechanism from a plurality of supplies, and means for maintaining a constant predetermined time relation between the operations of said mechanisms whereby pieces disposed on predetermined points of the traveling conveying mechanism at any of the stations will be folded identically by the timed operation of the folding mechanism.

6. A piece support and discharging platform for an ironing machine traveling flat-work conveyor, said support having cut-out forward corners to expose corner portions of a flat-work piece thereon to the engagement of the conveyor.

7. A fabric treating machine having therein an endless conveyor, means for supplying pieces of fabric to the conveyor at different points in its path, and means for laterally straightening all of said pieces supplied to the conveyor.

8. A fabric treating machine having therein opposed series of traveling piece edge holding devices, means for supplying pieces of fabric to the said devices of said series at different points in their path of travel, and means for causing said traveling devices to diverge after receiving pieces, thereby to straighten them laterally.

9. In combination with an ironing machine, feeder devices for supplying articles in sheet form thereto, folding devices for folding the articles from the ironing machine, and driving mechanism for the ironing machine and the feeder and folder devices; means for connecting the folder device with its driving mechanism, and means responsive to predetermined movement of said feeder device for actuating said folder connecting means.

10. In combination with an ironing machine, feeder devices for supplying articles in sheet form thereto, folding devices for folding the articles from the ironing machine, and driving mechanism for the ironing machine and the feeder and folder devices, means for connecting the folder device with its driving mechanism, and electrical means responsive to predetermined movement of said feeder device for actuating said folder connecting means.

11. An ironing machine for flat work including an ironing bed, and, means for conveying pieces to the bed including traveling piece holding means adapted to close and open for engaging and releasing the pieces, means for moving said piece holding means, means for causing different ones of said piece holding means to close at different places in their path of approach to the bed and means for causing said piece holding means to open.

12. An ironing machine for flat work including an ironing bed and means for conveying pieces to the bed including opposed series of traveling piece edge grasping devices, means for moving said devices, means for causing different pairs of said devices to close at different places in their path of approach to the bed, and means for discharging the pieces from said devices for ironing by the bed.

13. An ironing machine for flat work including an ironing bed, and means for conveying pieces to the bed including opposed series of traveling clips for pieces to be ironed, means for moving said clips, means for causing alternate pairs of clips to close at one place in their path of approach to the bed, means for causing the other pairs of clips to close at another place in said path, and means for causing all of said pairs to open.

14. An ironing machine for flat work including an ironing bed, a plurality of supports for pieces to be ironed, said supports being located for supply by different operators, conveying for carrying pieces from the supports to the bed, said conveying means including piece grasping devices timed to remove pieces from the plurality of supports in alternation.

15. An ironing machine for flat work including an ironing bed and means for conveying pieces to the bed including opposed series of traveling piece edge holding devices, piece supports adapted for supply by different operators, means for moving said supports into position to deliver their respective pieces to the traveling piece edge holding devices, at different places in the path of travel of the latter toward the bed, and means for causing said traveling devices to receive the pieces thus delivered.

16. An ironing machine for flat work including an ironing bed and means for conveying pieces to the bed including a traveling carrier accessible at different locations longitudinally of its course to receive pieces to be ironed, in combination with means for delivering pieces to be ironed to said carrier at said different places in timed relation.

17. Laundry machinery comprising in combination an ironing device, traveling conveying means for carrying pieces to be ironed to and through said ironing device, a folding device including means for folding pieces thus ironed on a line transverse to the direction of progress of the pieces through the ironing device, means indicative of equally spaced lengths on said conveying means for determining the placing of forward edges of pieces thereon in spaced relation, and means for timing the operation of the transverse folding means in relation of the travel of said conveying means.

18. In combination, folding mechanism, traveling conveyor mechanism adapted to present pieces to be folded to said folding mechanism, means indicative of predetermined spaced lengths on said conveying means whereby to determine the placing of pieces thereon at predetermined spacing, and means for causing operation of the folding mechanism to take place in timed relation to the rate of advance of said conveyor mechanism.

19. Laundry machinery comprising in combination an ironing device, traveling conveying means for carrying pieces to be ironed to and through said ironing device, said conveying means including a feed belt for the ironing device and an initial traveling conveyor adapted to deliver said pieces to said feed belt, a folding device including means for folding pieces thus ironed on a line transverse to the direction of progress of the pieces through the ironing device, means indicative of equally spaced lengths on said conveying means for determining the placing of forward edges thereon in spaced relation, said last-named means comprising clamps carried by the said initial conveyor, means for causing said clamps to release at a predetermined point with relation to the feed belt, and means for timing the operation of the transverse folding means in relation to the travel of said clamps.

20. An ironing machine having therein an ironing bed, and means for moving pieces to be ironed in a procession into and through said bed, said means including an endless conveyor extending in prolongation of the path of travel through said bed, the run of the conveyor which runs toward the bed having a deviation in path of travel such as to provide a space for an operator to occupy in feeding pieces to said conveyor intermediate the ends of its path of travel.

21. An ironing machine having therein an ironing bed, and means for moving pieces to be ironed in a procession into and through said bed, said means including an endless conveyor of which the run which carries pieces toward the bed has a course of travel such as to provide a plurality of portions of the conveyor in approximate prolongation of the direction of travel through the bed and spaces in front of each of said portions adapted to be occupied by feeding operators in approximate prolongation of said respective portions.

22. Laundry mechanism comprising in combination, an ironing device, a plurality of delivery devices adapted to discharge individual pieces to be ironed, and assembling conveyor mechanism for delivering the pieces to the ironing device in a procession in which pieces from the different delivery devices alternate.

23. Laundry machinery comprising in combination an ironing device, traveling conveying means for carrying pieces to be ironed to and through said ironing device, means indicative of equally spaced lengths on said conveying means for determining the placing of forward pieces thereon in spaced relation, and means operating in timed relation to said last-named means to remove the pieces from the conveying means after ironing.

24. Laundry machinery comprising in combination, an ironing device, a feeding conveyor leading to said ironing device, conveying means leading from the ironing devices, means on the feeding conveyor for holding at predetermined distances the pieces to be ironed, and means operating in timed relation to said feeding conveyor to remove pieces from the conveying means after ironing.

25. Laundry machinery comprising in combination, an ironing device, belt structure for carrying pieces thereto and means for placing pieces to be ironed on said belt structure, said means comprising an endless conveyor including a series of clamps adapted to grasp the pieces, and means for presenting said clamps in an open condition for reception of pieces, means whereby the clamps are closed on pieces conveyed thereby toward the ironing device, and means for opening the clamps in position to discharge to said belt structure.

FREDERICK T. ALLEN.

CERTIFICATE OF CORRECTION.

Patent No. 1,960,404.  May 29, 1934.

FREDERICK T. ALLEN.

It is hereby certified that error appears in the printed specification of the above numbered patent requiring correction as follows: Page 8, line 101, claim 14, after "conveying" insert means; and that the said Letters Patent should be read with this correction therein that the same may conform to the record of the case in the Patent Office.

Signed and sealed this 19th day of June, A. D. 1934.

Bryan M. Battey (Seal)  Acting Commissioner of Patents.